United States Patent
Prevost et al.

(10) Patent No.: US 10,087,111 B2
(45) Date of Patent: Oct. 2, 2018

(54) METHOD FOR PREPREGGING TACKIFIER FOR CMC ARTICLES

(71) Applicant: United Technologies Corporation, Farmington, CT (US)

(72) Inventors: Erica L. Prevost, Arlington, MA (US); Alex J. Sember, Waterbury, CT (US)

(73) Assignee: United Technologies Corporation, Farmington, CT (US)

( * ) Notice: Subject to any disclaimer, the term of this patent is extended or adjusted under 35 U.S.C. 154(b) by 74 days.

(21) Appl. No.: 15/022,015

(22) PCT Filed: Sep. 11, 2014

(86) PCT No.: PCT/US2014/055199
§ 371 (c)(1),
(2) Date: Mar. 15, 2016

(87) PCT Pub. No.: WO2015/041926
PCT Pub. Date: Mar. 26, 2015

(65) Prior Publication Data
US 2016/0229759 A1 Aug. 11, 2016

Related U.S. Application Data

(60) Provisional application No. 61/878,994, filed on Sep. 17, 2013.

(51) Int. Cl.
*B05D 3/12* (2006.01)
*C04B 41/50* (2006.01)
(Continued)

(52) U.S. Cl.
CPC .......... *C04B 41/5059* (2013.01); *B32B 18/00* (2013.01); *C04B 35/571* (2013.01);
(Continued)

(58) Field of Classification Search
CPC ....... B32B 18/00; C04B 41/45; C04B 1/1009; C04B 35/806; C04B 41/87
See application file for complete search history.

(56) References Cited

U.S. PATENT DOCUMENTS 5,466,506 A   11/1995   Freitas et al.
5,932,635 A   8/1999    Lee et al.
(Continued)

FOREIGN PATENT DOCUMENTS

EP   2363574   9/2011
EP   2716443   4/2014
(Continued)

OTHER PUBLICATIONS

Larberg, Ylva, Forming of Stacked Unidirectional Prepreg Materials, Doctoral Thesis, KTH Engineering Sciences, Stockholm, Sweden, 2012. (Year: 2012).*

(Continued)

*Primary Examiner* — Kelly M Gambetta
(74) *Attorney, Agent, or Firm* — Carlson, Gaskey & Olds, P.C.

(57) ABSTRACT

A method of creating a tackified prepreg includes steps of providing a fiber weave that have unidirectional fibers and woven sections spaced apart from one another to provide unidirectional fiber sections, applying a tackifier to the fiber weave, and separating the unidirectional fiber section from the woven sections.

18 Claims, 3 Drawing Sheets

(51) Int. Cl.
*B32B 18/00* (2006.01)
*C04B 35/571* (2006.01)
*C04B 35/80* (2006.01)
*F01D 5/28* (2006.01)
*F01D 9/04* (2006.01)
*C04B 41/00* (2006.01)
*C04B 41/87* (2006.01)
*F01D 9/02* (2006.01)

(52) U.S. Cl.
CPC .......... *C04B 35/806* (2013.01); *C04B 41/009* (2013.01); *C04B 41/87* (2013.01); *F01D 5/282* (2013.01); *F01D 5/284* (2013.01); *F01D 9/02* (2013.01); *F01D 9/041* (2013.01); *C04B 2235/5256* (2013.01); *C04B 2235/612* (2013.01); *C04B 2235/616* (2013.01); *C04B 2237/38* (2013.01); *F05D 2220/32* (2013.01); *F05D 2230/31* (2013.01); *F05D 2300/6033* (2013.01)

(56) References Cited

U.S. PATENT DOCUMENTS

| | | | |
|---|---|---|---|
| 6,670,026 | B2 | 12/2003 | Steibel et al. |
| 6,743,393 | B1 | 6/2004 | Petrak |
| 2007/0096371 | A1* | 5/2007 | McGuigan ................ B28B 1/40 264/640 |
| 2009/0057487 | A1 | 3/2009 | Velicki et al. |
| 2010/0056005 | A1* | 3/2010 | Okada .................... D03D 11/00 442/181 |
| 2011/0124256 | A1* | 5/2011 | Riehl ..................... C04B 35/589 442/178 |
| 2011/0293828 | A1* | 12/2011 | Eberling-Fux .......... B29B 11/16 427/249.2 |
| 2012/0267833 | A1 | 10/2012 | Riehl |
| 2013/0167374 | A1 | 7/2013 | Kirby et al. |
| 2014/0342630 | A1* | 11/2014 | Amtmann ............ D03D 25/005 442/203 |

FOREIGN PATENT DOCUMENTS

FR 2976968 12/2012
WO 20130104056 7/2013

OTHER PUBLICATIONS

Hexcel, HexPly Prepreg Technology, Hexcel Publication No. FGU 017c, Jan. 2013. (Year: 2013).*
Supplementary European Search Report for European Patent Application No. 14846455.5 dated Apr. 5, 2017.
International Search Report for PCT/US2014/055199 dated Dec. 19, 2014.
International Preliminary Report on Patentability for PCT Application No. PCT/US2014/055199 dated Mar. 31, 2016.

* cited by examiner

METHOD FOR PREPREGGING TACKIFIER FOR CMC ARTICLES

CROSS-REFERENCE TO RELATED APPLICATIONS

This application claims priority to U.S. Provisional Application No. 61/878,994, which was filed on Sep. 17, 2013 and is incorporated herein by reference.

BACKGROUND

This disclosure relates to a method of manufacturing a gas turbine engine airfoil from a CMC.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

It is desirable to provide fiber-based articles for their lightweight and durability in high temperature applications. One example process wraps a resin impregnated ceramic matrix composite (CMC) cloth about a mandrel to form an article to provide a desired shape. The article and resin are heated to high temperatures to pyrolyze the structure and form a crystalline ceramic metal matrix.

SUMMARY

In one exemplary embodiment, a method of creating a tackified prepreg includes steps of providing a fiber weave that have unidirectional fibers and woven sections spaced apart from one another to provide unidirectional fiber sections, applying a tackifier to the fiber weave, and separating the unidirectional fiber section from the woven sections.

In a further embodiment of the above, the woven sections are in alternating relationship to the unidirectional fiber sections. The woven sections include cross fibers arranged transverse to the unidirectional fibers.

In a further embodiment of any of the above, the separating step includes cutting the unidirectional sections from the woven sections.

In a further embodiment of any of the above, the method includes the step of feeding the fiber weave between rollers.

In a further embodiment of any of the above, the fiber weave is fed through a bath of the tackifier.

In a further embodiment of any of the above, the rollers include a feed direction. The unidirectional fibers are arranged in the same direction as the feed direction.

In a further embodiment of any of the above, the method includes the step of arranging layers of the unidirectional fiber sections onto one another to provide a stack.

In a further embodiment of any of the above, the fibers are ceramic.

In a further embodiment of any of the above, the tackifier is a pre-ceramic polymer.

In a further embodiment of any of the above, the tackifier is a solid at room temperature.

In a further embodiment of any of the above, the tackifier is an amorphous solid.

In another e exemplary embodiment, a method of creating a tackified prepreg, includes steps of providing a fiber weave having unidirectional fibers and woven sections spaced apart from one another to provide unidirectional fiber sections, applying a tackifier to the fiber weave, arranging layers of the fiber weave onto one another to provide a stack, and wrapping the stack around a form to provide an article having a desired shape.

In a further embodiment of the above, the method includes the step of applying a resin to the article in a mold.

In a further embodiment of any of the above, the resin is a liquid at room temperature.

In a further embodiment of any of the above, the resin is a ceramic-based.

In a further embodiment of any of the above, the tackifier and resin are silicon carbide-based.

In a further embodiment of any of the above, the method includes the step of heating and curing the article.

In a further embodiment of any of the above, the method includes the step of machining the cured article.

In a further embodiment of any of the above, the method includes the step of pyrolyzing the article, including the tackifier and the resin, subsequent to the machining step.

In another exemplary embodiment, a CMC article for a gas turbine engine includes a wall that has multiple tacks joined to one another. Each stack includes multiple layers. The layers consist of unidirectional fibers that form a ceramic matrix composite with a resin and a tackifier that are different than one another.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
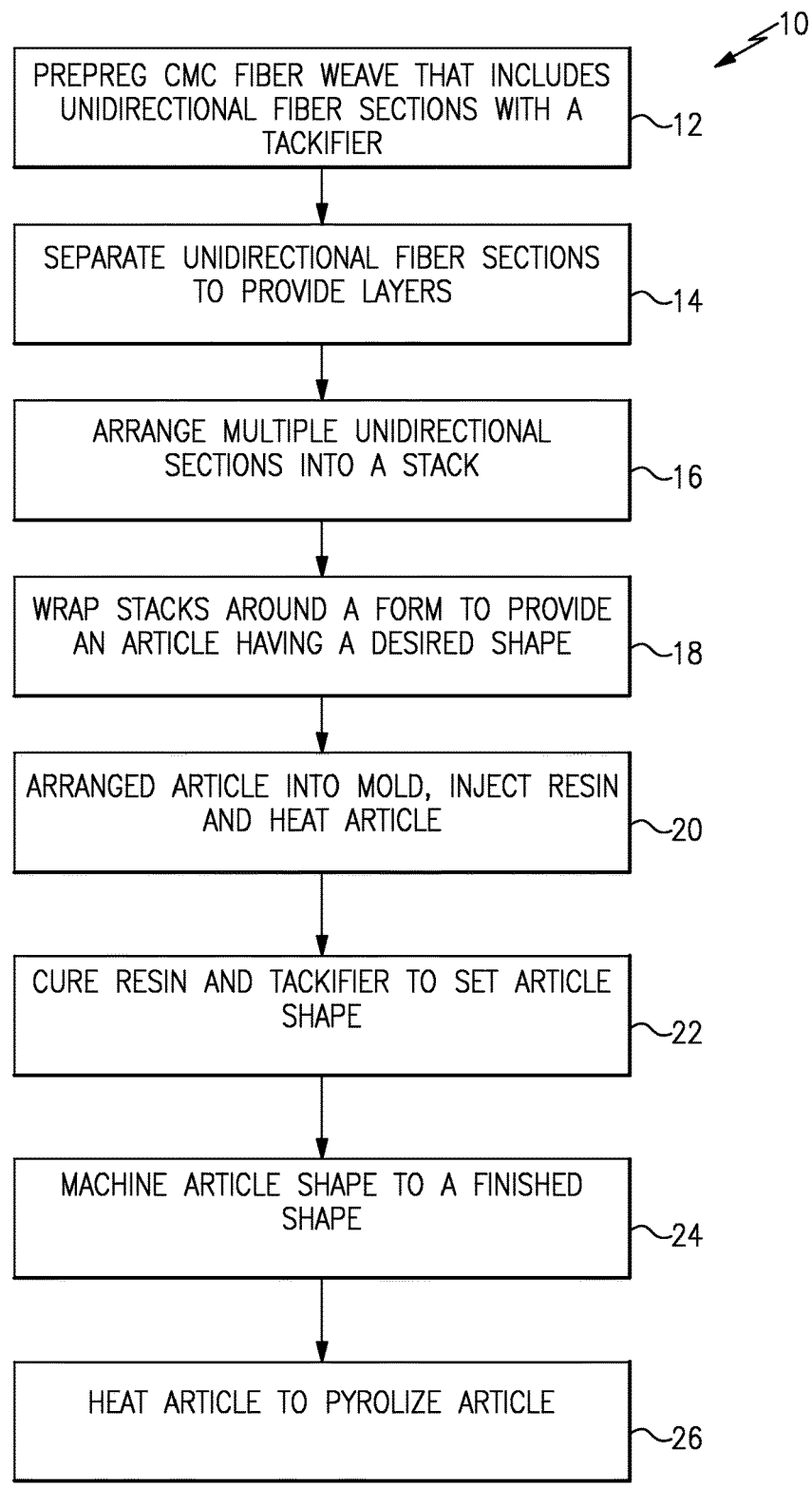
FIG. 1 is a flow chart of an example method of manufacturing a CMC article.
Figure 2:
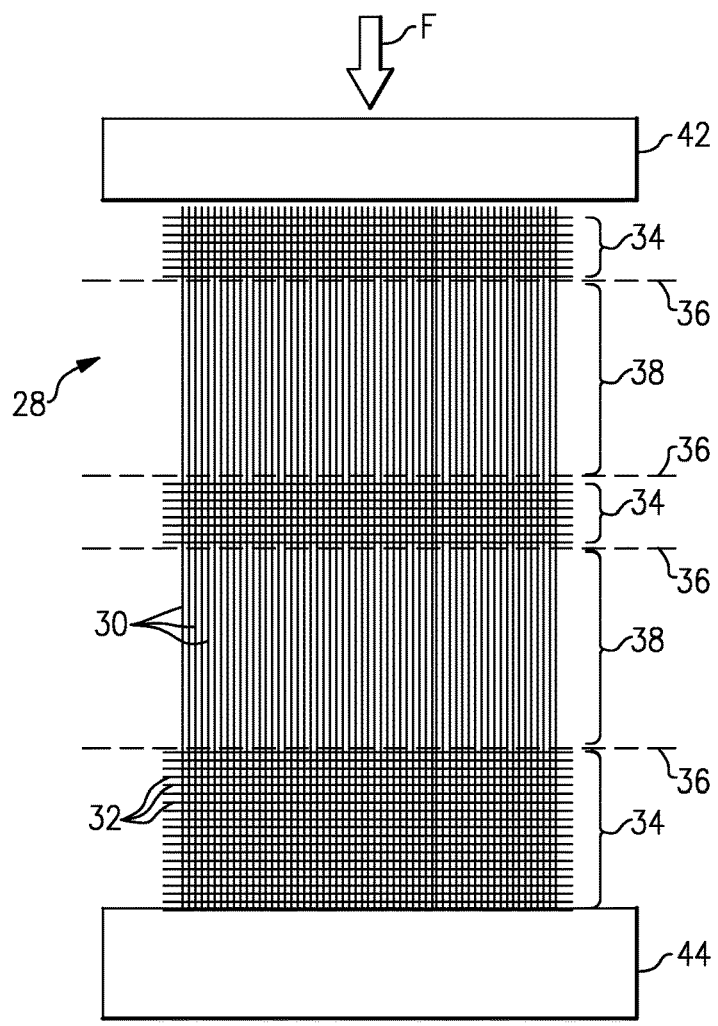
FIG. 2 is a schematic view of a prepregging process.

Referring to FIG. 1, a method 10 is disclosed of manufacturing ceramic matrix composite (CMC) articles. The method 10 includes prepregging a CMC fiber weave that includes unidirectional fiber sections with a tackifier, as indicated at block 12. Referring to FIG. 2, the fiber weave 28 includes unidirectional fibers 30 woven with cross fibers 32 to provide spaced apart woven sections 34. Unidirectional fiber sections 38 are provided between the woven sections 34. The woven sections 34 provide stability to the unidirectional fibers 30 during the prepregging process to hold the unidirectional fibers 30 in alignment with one another during the tackifying process. The fiber weave 28 is fed through rollers, for example, first and second rollers 42, 44 with the unidirectional fibers 30 oriented in a same direction as a feed direction F of the rollers 42, 44.

Figure 3:
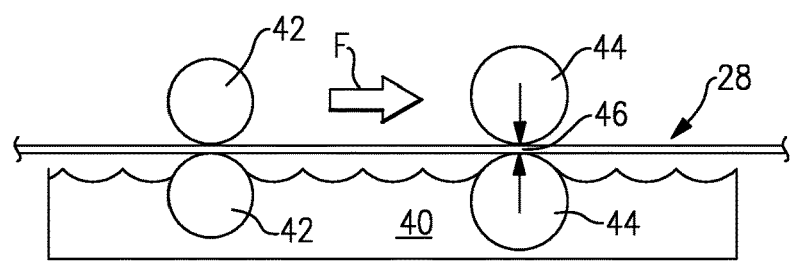
FIG. 3 is a side view of the prepregging process shown in FIG. 2.

Referring to FIG. 3, the tackifier 40 may be applied to the fiber weave 28 in a bath. The second rollers 44 are arranged with respect to one another to provide a desired thickness 46 of the tackified fiber weave. Once the fiber weave 28 has been tackified, the unidirectional fibers 30 in the unidirectional sections 38 may be separated from the woven sections 34 at cut lines 36 shown in FIG. 2 (block 14 in FIG. 1). The unidirectional fibers 30 are sufficiently adhered to one another with the tackifier, such that they can be handled and trimmed without falling apart or frying the tow.

In one example, the tackifier is a pre-ceramic polymer material, for example, a silicon carbide. The tackifier is melt processable polymer solid at room temperature, for example, an amorphous solid that readily flows at moderate temperatures. In order to not compromise the integrity of the CMC, a tackifier was chosen that has the same chemical backbone as the matrix that material used, polycarbosilane. Upon pyrolyzing of the tackifier it is incorporated into the matrix of the CMC. The tackifier can also be loaded with filler particles to aid in processing in addition to altering desired CMC properties.

Figure 4:
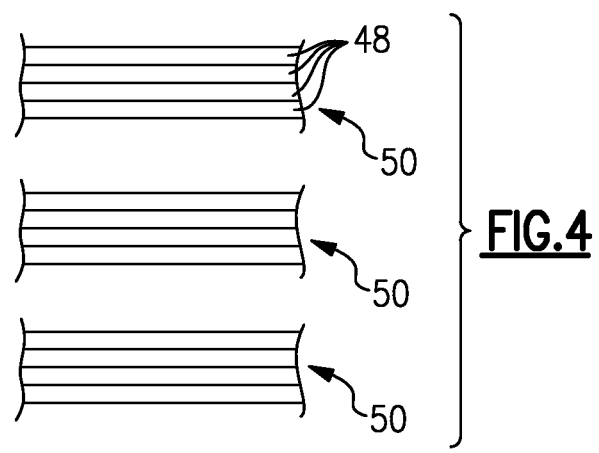
FIG. 4 is a schematic view of multiple layers of fiber material kitted into stacks.

The degree of "tack" that is provided by the tackifier enables the layers of the unidirectional fibers 38 to be kitted and stuck to one another to produce stacks 50, as shown in FIG. 4 (block 16 in FIG. 1). The layers 48 are sufficiently sticky such that the layers will stick to one another at room temperature using hand pressure only or low levels of heat.

The tackifier process will provide the fabric/fiber to which it is applied with the appropriate handling characteristics that allow the fabric to be cut, handled and kitted while maintaining edge, ply integrity and fiber alignment. The fabric/fiber can then be utilized in RTM processing of complex shapes while maintaining handling characteristics. This process is suitable for the processing of unidirectional fiber tows.

Figure 5:
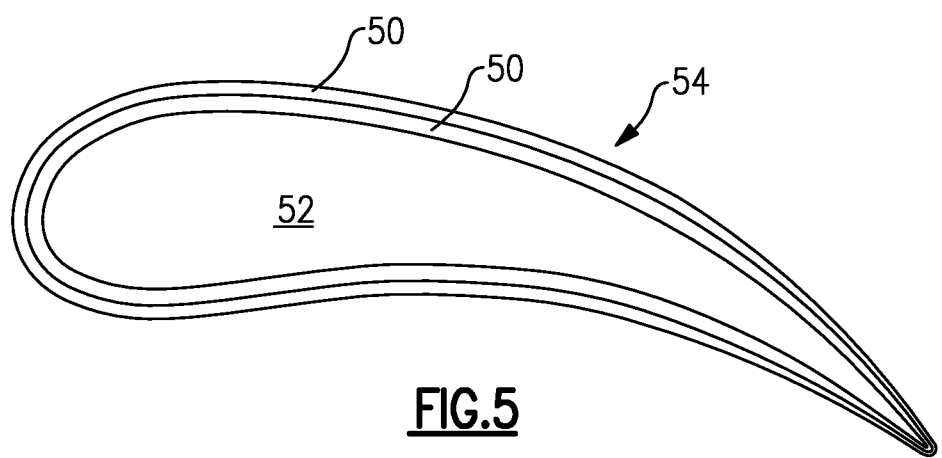
FIG. 5 is an example cross-sectional view of the stacks wrapped about a mandrel providing an article having a desired shape.

Returning to FIG. 1, block 18, the stacks 50 are wrapped about a form 52, such as a mandrel shown in FIG. 5, to provide an article 54 having a desired shape. With continuing reference to FIG. 1, the article is arranged into a mold and a pre-ceramic polymer resin is injected into the mold. The resin and tackifier are different than one another. In one example, the resin is a liquid at room temperature. In one example, the tackifier has a greater carbon content than the resin.

The article is heated within the mold, as indicated at block 20. The article is allowed to cool and cure, enabling the resin and tackifier to set and the article to sufficiently take its shape for subsequent handling, as indicated at block 22. The article then may be machined to a finished shape, as indicated at block 24. Finally, the article may be arranged in a fixture to maintain its shape and heated to high temperatures, for example, 1000-1600° C., to pyrolized the article including the tackifier and resin, to form a crystalline ceramic matrix composite. The CMC article includes multiple stacks, each having multiple layers. The layers consist of unidirectional fibers that form a ceramic matrix composite with the resin and the tackifier.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although example embodiments have been disclosed, a worker of ordinary skill in this art would recognize that certain modifications would come within the scope of the claims. For that and other reasons, the following claims should be studied to determine their true scope and content.

What is claimed is:

1. A method of creating a tackified prepreg, comprising steps of:
   providing a fiber weave having unidirectional fibers and woven sections spaced apart from one another to provide unidirectional fiber sections;
   applying a tackifier to the fiber weave;
   separating the unidirectional fiber section from the woven sections; and
   arranging layers of the unidirectional fiber sections onto one another to provide a stack.

2. The method according to claim 1, wherein the woven sections are in alternating relationship to the unidirectional fiber sections, the woven sections include cross fibers arranged transverse to the unidirectional fibers.

3. The method according to claim 1, wherein the separating step includes cutting the unidirectional sections from the woven sections.

4. The method according to claim 1, comprising the step of feeding the fiber weave between rollers.

5. The method according to claim 4, wherein the fiber weave is fed through a bath of the tackifier.

6. The method according to claim 4, wherein the rollers include a feed direction, and the unidirectional fibers are arranged in the same direction as the feed direction.

7. The method according to claim 1, wherein the fibers are ceramic.

8. The method according to claim 1, wherein the tackifier is a pre-ceramic polymer.

9. The method according to claim 8, wherein the tackifier is a solid at room temperature.

10. The method according to claim 9, wherein the tackifier an amorphous solid.

11. The method according to claim 1, comprising the steps of
   wrapping the stack around a form to provide an article having a desired shape.

12. The method according to claim 11, comprising the step of applying a resin to the article in a mold.

13. The method according to claim 12, wherein the resin is a liquid at room temperature.

14. The method according to claim 13, wherein the resin is a ceramic-based.

15. The method according to claim 14, wherein the tackifier and resin are silicon carbide-based.

16. The method according to claim 11, comprising heating and curing the article.

17. The method according to claim 16, comprising the step of machining the cured article.

18. The method according to claim 17, comprising the step of pyrolyzing the article, including the tackifier and the resin, subsequent to the machining step.

* * * * *